(12) United States Patent
Maguire et al.

(10) Patent No.: US 11,167,895 B2
(45) Date of Patent: Nov. 9, 2021

(54) CLOSURE WITH SPOUT AND MEANS FOR INTRODUCING AN ADDITIVE INTO A BEVERAGE CONTAINER

(71) Applicant: Gizmo Packaging Limited (Murgitroyd), Glasgow (GB)

(72) Inventors: Jordan Maguire, Glasgow (GB); Bernard Derek Frutin, Glasgow (GB)

(73) Assignee: Gizmo Packaging Limited, Glasgow (GB)

(*) Notice: Subject to any disclaimer, the term of this patent is extended or adjusted under 35 U.S.C. 154(b) by 273 days.

(21) Appl. No.: 16/466,554

(22) PCT Filed: Dec. 11, 2017

(86) PCT No.: PCT/GB2017/053702
§ 371 (c)(1),
(2) Date: Jun. 4, 2019

(87) PCT Pub. No.: WO2018/109445
PCT Pub. Date: Jun. 21, 2018

(65) Prior Publication Data
US 2019/0337681 A1    Nov. 7, 2019

(30) Foreign Application Priority Data
Dec. 12, 2016   (GB) .................................. 1621054

(51) Int. Cl.
*B65D 51/28*   (2006.01)
*A23L 2/52*    (2006.01)
(Continued)

(52) U.S. Cl.
CPC ............ *B65D 51/2864* (2013.01); *A23L 2/52* (2013.01); *B65D 41/34* (2013.01);
(Continued)

(58) Field of Classification Search
CPC .. B65D 39/04; B65D 39/007; B65D 47/0857; B65D 47/06; B65D 47/068;
(Continued)

(56) References Cited

U.S. PATENT DOCUMENTS 6,003,728 A *  12/1999  Elliott ................ B65D 47/0804
                                                      206/219
6,230,884 B1 *  5/2001  Coory ................. B65D 51/2821
                                                      206/222
(Continued)

FOREIGN PATENT DOCUMENTS

WO    2006111803 A2   10/2006
WO    2007073064 A1    6/2007
(Continued)

OTHER PUBLICATIONS

International Search Report and Written Opinion for PCT/GB2017/053702, dated Feb. 23, 2018, 9 pages.
(Continued)

*Primary Examiner* — Kareen K Thomas
(74) *Attorney, Agent, or Firm* — Faegre Drinker Biddle & Reath LLP

(57) ABSTRACT

A closure device for use with a beverage container comprises a spout cap member having a top wall with a spout aperture covered by a spout cover, a side wall for securing to a neck of the container, and a plug support structure. A fluid chamber containing an additive liquid and a pressurised propellant is movably held within the spout cap member. A plug member is fixed to the plug support structure and sealingly engages a bottom aperture of the fluid chamber. The spout cover includes a strut extending through the spout aperture to an abutment surface on the fluid chamber.

13 Claims, 6 Drawing Sheets

(51) Int. Cl.
*B65D 41/34* (2006.01)
*B65D 81/32* (2006.01)
*B65D 47/12* (2006.01)

(52) U.S. Cl.
CPC ......... *B65D 41/3447* (2013.01); *B65D 47/12* (2013.01); *B65D 51/28* (2013.01); *B65D 51/2892* (2013.01); *B65D 81/32* (2013.01); *B65D 81/3222* (2013.01); *A23V 2002/00* (2013.01); *B65D 2401/15* (2020.05)

(58) Field of Classification Search
CPC ............ B65D 51/2864; B65D 51/2892; B65D 41/34; B65D 81/32; B65D 47/12; B65D 51/28; B65D 41/3447; B65D 81/3222; B65D 2401/15; A23L 2/52; A23V 2002/00
See application file for complete search history.

(56) References Cited

U.S. PATENT DOCUMENTS

| | | | | |
|---|---|---|---|---|
| 9,242,772 | B1* | 1/2016 | Anderson | B65D 51/2835 |
| 9,242,773 | B1* | 1/2016 | Anderson | B65D 51/2835 |
| 9,290,308 | B2* | 3/2016 | Bashyam | B65D 47/243 |
| 10,464,714 | B2* | 11/2019 | Canziani Hoffa | B65D 47/00 |
| 2010/0163442 | A1* | 7/2010 | Lee | B65D 47/243 206/222 |
| 2010/0163509 | A1 | 7/2010 | Canziani Hoffa et al. | |
| 2010/0237075 | A1* | 9/2010 | Wilhelm | B65D 51/2828 220/284 |
| 2011/0174642 | A1* | 7/2011 | Coon | B65D 51/2835 206/222 |
| 2015/0034673 | A1* | 2/2015 | Hopkins | B65D 47/243 222/129 |

FOREIGN PATENT DOCUMENTS

| | | |
|---|---|---|
| WO | 20070129116 A1 | 11/2007 |
| WO | 2008117321 A1 | 10/2008 |
| WO | 2015169822 A1 | 11/2015 |
| WO | 2017207962 A1 | 12/2017 |

OTHER PUBLICATIONS

UK Search Report for GB1621054.4 dated Jan. 19, 2018, 4 pages.
International Preliminary Report on Patentability for PCT/GB2017/053702 dated Jun. 18, 2019, 6 pages.

* cited by examiner

CLOSURE WITH SPOUT AND MEANS FOR INTRODUCING AN ADDITIVE INTO A BEVERAGE CONTAINER

FIELD OF THE INVENTION

The present invention relates to a closure device, for use with a container such as a beverage container, which can fire a pressurised additive liquid into a liquid in the container by operation of the closure device. The invention also relates to a container including such a closure device and to a method of introducing an additive liquid by means of operating such a closure device.

BACKGROUND

In a number of applications, such as mixtures of different liquids, it may be necessary to release and mix an additive liquid into another liquid shortly before the liquid mixture is used. It may not be possible or desirable to store the liquids in a premixed form, as they may react undesirably with each other when stored as the mixture for a period of time. An example of this may be two component pharmaceuticals which have a longer shelf life when unmixed than they do when mixed. However, it can also apply to other liquids or to mixtures of liquids and gases, such as water, alcoholic beverages, other beverages, and other solvents or solutions. The term "beverage" when used in this specification includes any liquid, whether or not provided for drinking purposes, which may be mixed with an additive liquid, and is not limited to potable beverages.

A closure device for use with a beverage container which can release an additive liquid into the beverage by operation of the closure device is known from the prior art. International Patent Application WO2007/129116 discloses a closure device comprising a cap member defining a fluid chamber and a plug member which sealingly engages an aperture in the bottom of the fluid chamber. The cap member is raised relative to the plug member by unscrewing the cap member, from a closed position in which the plug member closes the bottom aperture to an open position in which the plug member is partially withdrawn from the bottom aperture to allow pressurised fluid to flow from the fluid chamber through a nozzle passage in the plug member to the beverage in the beverage container.

The known device has the disadvantage that it requires removal of the cap member to fire the additive into the beverage container, so it is not suitable for sports cap containers, where the cap member remains on the beverage container and the user drinks the beverage through a spout.

SUMMARY OF THE INVENTION

It is an object of the present invention to overcome one or more disadvantages of the prior art.

According to a first aspect of the present invention there is provided a closure device for use with a container having a main liquid compartment and an opening with a container neck, the closure device comprising:
- a spout cap member having a top wall with a spout aperture, a side wall extending below the top wall and adapted to be secured to the opening of the container, and a plug support structure extending from the top wall inside the side wall,
- a fluid chamber movably held within the spout cap member and having a bottom aperture, the fluid chamber containing an additive liquid and a pressurised propellant,
- a plug member fixed to the plug support structure and sealingly engageable in the bottom aperture of the fluid chamber, and
- a spout cover adapted to removably cover the spout aperture,
- wherein the spout cover includes a strut extending through the spout aperture to an abutment surface on the fluid chamber,
- wherein the fluid chamber is adapted to move relative to the spout cap member between:
- a first armed position of the closure device, in which the plug member seals the bottom aperture closed, and the spout cover is engaged with the spout cap member, and the pressurised propellant urges the abutment surface on the fluid chamber against the strut of the spout cover, and
- a second firing position, in which the spout cover is disengaged from the spout cap member, and the pressurised propellant urges the fluid chamber upwards relative to the plug member, so that the plug member no longer seals the bottom aperture closed.

When the spout cover is removed, the closure device moves to the firing position, so that the additive liquid is fired into the main liquid compartment of the container to which the closure device is attached, under the action of the pressurised propellant.

A user can then drink the beverage, including the additive liquid, from the container through the spout aperture, while the fluid chamber remains held within the spout cap member. The spout cover can subsequently be replaced on the spout cap member to close the spout aperture.

The side wall of the cap member may be threaded and may be adapted to engage with a thread or projection provided on the container neck.

The spout cover may include a spout aperture plug member adapted to seal the spout aperture closed when the spout cover is engaged with the spout cap member, In the first armed position the spout cover may be engaged with the spout cap member by means of a detachable member. The detachable member may be a tamper-proof band connected to the spout cover by a frangible web.

Alternatively the spout cover may be engaged with the spout cap member by mutually engaging threads. The spout cover may be removed from the spout cap member by twisting, thereby raising the strut and causing the fluid chamber to move from the armed position to the firing position.

The plug member may have one or more nozzles therein. In one alternative aspect the nozzle may be provided at the lower end of the plug member, opposite the fluid chamber. The plug member may include an internal nozzle passage extending axially upwards in the plug member from the nozzle.

The plug member may include a transverse internal passage extending to the lateral exterior surface of the plug member and in communication with the internal nozzle passage.

In the armed position the transverse internal passage may be closed by the bottom aperture of the fluid chamber. For example an upper seal may be provided between the plug member and the bottom aperture above the transverse internal passage.

In the firing position the upper seal may no longer seal between the plug member and the bottom aperture, such that the fluid chamber is in fluid communication with the transverse internal passage and the nozzle. A lower seal may be provided between the plug member and the bottom aperture below the transverse internal passage so that the additive liquid passes only through the nozzle and not around the plug member.

Alternatively the plug member may include a longitudinal internal passage extending to the upper exterior surface of the plug member and in communication with the internal nozzle passage.

In the closed and armed positions the longitudinal internal passage may be closed by a projecting plug fixed relative to the fluid chamber.

In the firing position the projecting plug may be spaced from the upper exterior surface of the plug member, such that the fluid chamber is in fluid communication with the longitudinal internal passage and the nozzle.

The plug member may include sealing means to provide a seal between the lateral external surface of the plug member and the aperture of the fluid chamber. The sealing means may be a coating of an elastomeric material, such as a soft plastic. The sealing means may form the upper and/or lower seals.

In another alternative aspect the nozzle or nozzles may be provided at the lower end of the plug member, opposite the fluid chamber. The plug member may include an internal nozzle passage extending axially upwards in the plug member from the nozzle.

The plug support structure and the remainder of the spout cap member may be formed as separate moulded items which are fixed to each other after moulding. The remainder of the spout cap member is hereby referred to as the spout cap body.

The spout cap body may include a collar extending downwards from the top wall and radially inside the side wall.

The plug support structure may be adapted to fit around the collar of the spout cap body.

The sleeve of the plug support structure may include a detent member adapted to engage with a corresponding detent member on the spout cap body. Threading of the sleeve onto the collar may cause the plug support structure to be locked permanently to the spout cap body by interlocking engagement of the detent members.

The plug support structure may include two or more leg members extending from the sleeve to the plug member.

The fluid chamber may be formed as a separate moulded item.

The fluid chamber may include one or more external spacers adapted to hold the fluid chamber substantially centrally within the spout cap member. The spacers may be wings. The spacers may engage with the collar of the spout cap body.

The side wall of the spout cap member may be provided with an anti-tamper band to prevent removal of the spout cap member from a neck of a beverage container without prior removal of the anti-tamper band.

According to a second aspect of the present invention there is provided a container having a container neck and an opening, wherein the container contains a liquid, and wherein a closure device according to the first aspect of the present invention is secured to the container neck to close the container.

Preferably the side wall of the spout cap member extends outside the container neck.

Preferably the collar of the spout cap body and/or the sleeve of the plug support structure extend inside the container neck.

According to a third aspect of the present invention there is provided a method of introducing an additive liquid into a container, the method comprising:
    providing a closure device according to the first aspect of the invention with a liquid additive and a pressurised propellant inside the fluid chamber,
    while the closure device is in the first armed position placing the closure device on the neck of a container containing a liquid,
    at least partially removing the spout cover from the spout cap member, thereby raising the strut of the spout cover relative to the spout cap member,
    allowing the internal pressure of the pressurised propellant inside the fluid chamber to raise the fluid chamber relative to the plug member to the second firing position, and
    urging the additive liquid from the fluid chamber into the container under pressure of the pressurised propellant in the fluid chamber while the closure device is in the second firing position.

Preferably the method includes the step of mixing the additive liquid with the liquid in the container.

The liquid in the container may be a beverage or a chemical or pharmaceutical composition. The liquid may be of any viscosity, for example a gel.

The mixing step may be effected through ejection of the additive liquid through the nozzle at a sufficient velocity under pressure of the pressurised propellant in the fluid chamber.

BRIEF DESCRIPTION OF THE DRAWINGS

The invention will be described, by way of example only, with reference to the drawings in which.

DESCRIPTION OF SPECIFIC EMBODIMENTS

Figure 1:
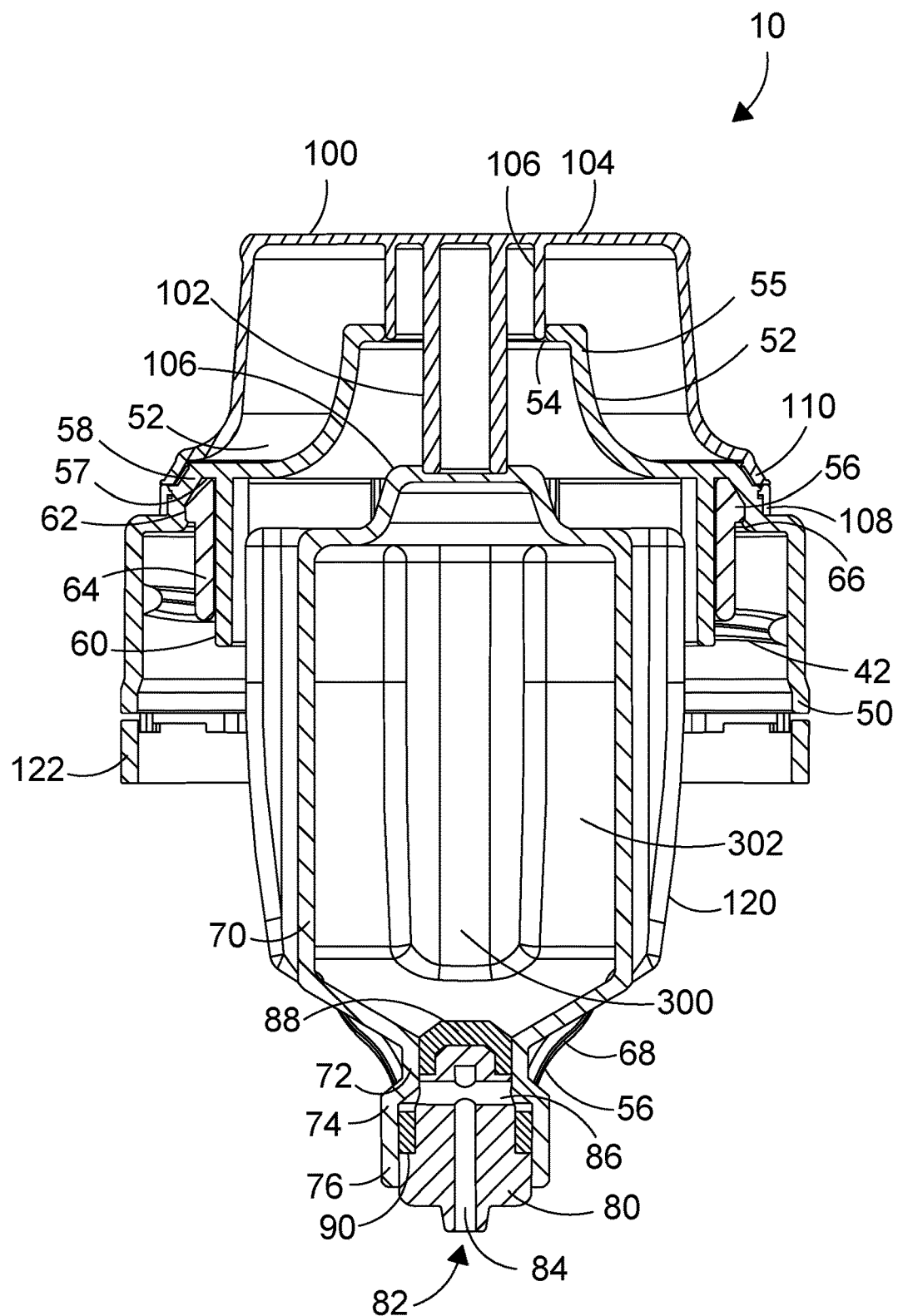
FIG. 1 shows a schematic cross-sectional view of a closure device according to an embodiment of the present invention.
Figure 2:
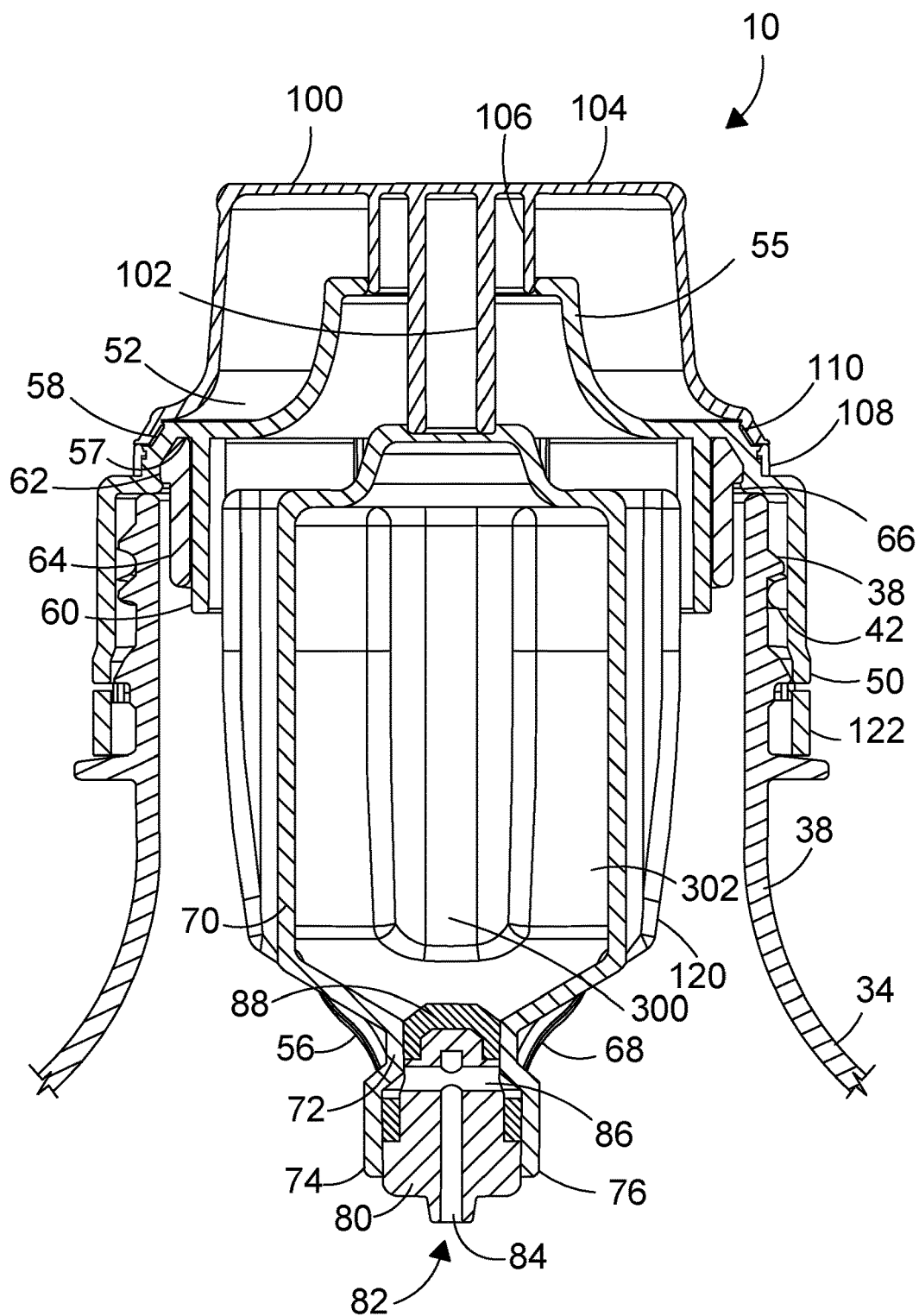
FIG. 2 shows a schematic cross-sectional view of the closure device of FIG. 1 when attached to the neck of a bottle in a first armed position.

With reference to FIGS. 1 and 2 there is shown a closure device 10 in a first closed position. In FIG. 2 the closure device 10 is depicted connected to the neck 38 of a container 34 that contains a fluid in a main liquid compartment (not shown). The container 34 may be, for example, a PET bottle. The container 34 may hold a variety of liquids such as water, or a pharmaceutical or glucose solution. The liquid may be for consumption, but may instead be a chemical composition for other use, such as cleaning, healthcare, hair dye application, painting or household maintenance. However, for the purposes of this description, the liquid held in the container 34 will hereinafter be referred to as the beverage.

The closure device 10 includes a spout cap member 36. The closure device 10 is used to close the neck 38 of the container 34, and is attached to the neck 34 by the spout cap member 36 by means of a threaded arrangement. The threaded arrangement comprises an external thread 46 located on an outer surface of the container neck 38 that engages with an internal thread 42 located on an inner surface of a side wall 50 of the spout cap member 36. All of the aforementioned components may be formed of polypropylene, or other suitable material.

The spout cap member 36 has a top wall 52 with a spout aperture 54. The side wall 50 extends below the top wall 52 and is adapted to be secured to the neck 38 of the container 34. The spout cap member 36 also has a plug support structure 56 extending from the top wall 52. In the illustrated example the plug support structure 52 is formed separately from the spout cap member and is secured to the underside of the top wall 52 by engaging with an annular channel 57 formed by opposing outer and inner cylindrical walls 58, 60 of the spout cap member 36.

The spout cap body 55 is the upper portion of the spout cap member 36, not including the plug support structure 56. The inner cylindrical wall 60 forms a collar, which aids fitting of the plug support structure 56 to the spout cap body 55.

A locking detent formation 62 on a cylindrical wall portion 64 at the top of the plug support structure 56 engages with a corresponding detent formation 66 on the wall 58 to secure the plug support structure 56 to the remainder of the spout cap member 36. However the plug support structure 56 could be formed integrally with the spout cap member 36 or connected in any other suitable manner. The plug support structure 56 includes a number of legs 68 which extend from the cylindrical wall portion 64 to the bottom of a plug member 80 at the bottom of the plug support structure 56.

The closure member 10 includes a fluid chamber 70 which is movably held within the spout cap member 36. The fluid chamber 70 contains an additive liquid and a pressurised propellant. It has a bottom aperture 72 with an upper narrow neck portion 74 and a lower wider neck portion 76. The aperture is closed in the armed position illustrated in FIGS. 1 and 2 by the plug member 80 of the plug support structure 56. The plug member 80 includes a nozzle 82 provided at the lower end of the plug member 80, opposite the fluid chamber 70. The plug member includes an internal nozzle passage 84 extending axially upwards in the plug member 80 from the nozzle 82, which communicates with a transverse internal passage 86 extending to the lateral exterior surface of the plug member 80.

In the armed position shown in FIGS. 1 and 2 the transverse internal passage 86 is sealed closed by the upper seal 88 acting between the upper portion of the plug member 80 and the upper narrow neck portion 74 of the bottom aperture 72, above the transverse internal passage 86. This prevents communication between the fluid chamber 70 and the nozzle 82.

Figure 3:
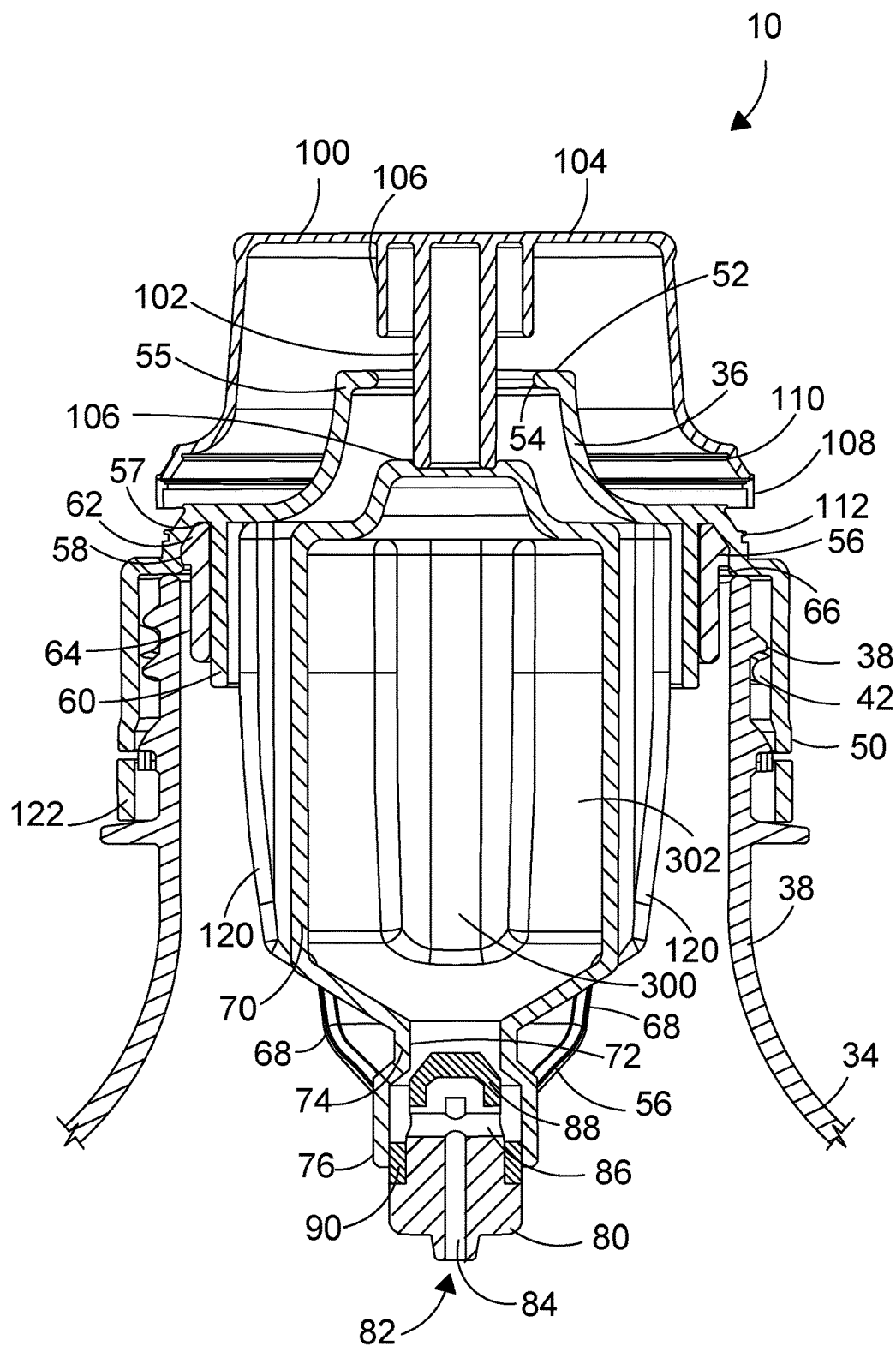
FIG. 3 shows a schematic cross-sectional view of the closure device of FIG. 2 in a second firing position.

In the firing position shown in FIG. 3 the upper seal 88 no longer seals between the plug member 80 and the upper narrow neck portion 74 of the bottom aperture 72, such that the fluid chamber 70 is in fluid communication with the transverse internal passage 86 and the nozzle 82. A lower seal 90 seals between the plug member 80 and the lower wider neck portion 76 of the bottom aperture 72, below the transverse internal passage 86, so that a communication path exists only through the nozzle 82 and not around the plug member 80.

The closure device 10 also includes a spout cover 100 which removably covers the spout aperture 54. The spout cover 100 includes a strut 102 extending from the underside of the top wall 104 of the spout cover 100 through the spout aperture 54 to an abutment surface 106 on the fluid chamber 70. The strut 102 serves to hold the fluid chamber 70 down so that the plug member 80 seals the bottom aperture 72, as long as the spout cover 100 remains secured to the spout cap member 36. The strut 102 is shown as a cylindrical moulding, which is formed integrally with the spout cover 100, but it can be of any suitable shape or size, and may be attached to the spout cover 100 in any suitable manner, as long as it achieves the function of holding the fluid chamber in the armed position shown in FIGS. 1 and 2.

The spout cover 100 also includes a spout aperture plug member 106 extending from the underside of the top wall 104 of the spout cover 100 to seal the spout aperture 54 closed when the spout cover 100 is secured to the spout cap member 36, and the closure device 10 is in the armed position shown in FIGS. 1 and 2.

Any suitable means may be used to secure the spout cover 100 to the spout cap member 36, as long as the spout cover can be removed by a user. In the illustrated embodiment the spout cover 100 is engaged with the spout cap member 36 by means of a detachable member, in the form of a tamper-proof band 108 which engages with a corresponding detent 112 on the spout cap member 36 and which is connected to the spout cover 100 by a frangible web 110. The band 108 may be removed by tearing, which permits the spout cover 100 to be removed.

Alternatively the spout cover 100 may be engaged with the spout cap member 36 by mutually engaging threads (not shown), or by any other suitable connecting means.

In use, removal of the spout cover 100 and the strut 102 permits the fluid chamber 70 to rise relative to the spout cap member 36, under the action of the internal pressure in the fluid chamber 70 which acts to expel the plug member 80, so that the fluid chamber 70 moves from the first armed position of the closure device shown in FIGS. 1 and 2, in which the plug member 80 seals the bottom aperture 72 closed and the pressurised propellant urges the abutment surface 106 on the fluid chamber 70 against the strut 102 of the spout cover 100, to a second firing position of the closure device shown in FIG. 3, in which the spout cover 100 is disengaged from the spout cap member 36, and the pressurised propellant urges the fluid chamber 70 upwards relative to the plug member 80, so that the plug member 80 no longer seals the bottom aperture 72 closed.

When the spout cover 100 is removed, the closure device 10 moves to the firing position, so that the additive liquid is fired into the main liquid compartment of the container 34 to which the closure device 10 is attached, under the action of the pressurised propellant. A user can then drink the beverage, including the additive liquid, from the container 10 through the spout aperture 54, while the fluid chamber 70 remains held within the spout cap member 36. The spout cover 100 can subsequently be replaced on the spout cap member 36 to close the spout aperture 54.

Any suitable plug member may be used to close the bottom aperture 72 of the fluid chamber 70, and the invention is not limited to the particular plug member illustrated. For example, in an alternative embodiment (not illustrated), the plug member 70 may include a longitudinal internal passage extending to the upper exterior surface of the plug member and in communication with the internal nozzle passage. In the closed and armed positions the longitudinal internal passage may be closed by a projecting plug fixed relative to the fluid chamber. In the firing position the projecting plug may be spaced from the upper exterior surface of the plug member, such that the fluid chamber is in fluid communication with the longitudinal internal passage and the nozzle.

The plug member 70 may include sealing means to provide a seal between the lateral external surface of the plug member 70 and the bottom aperture 72 of the fluid chamber 70. The sealing means may be a coating of an elastomeric material, such as a soft plastic. The sealing means may form the upper and/or lower seals.

The fluid chamber 70 is preferably formed by blow moulding. It includes one or more external spacers or ribs 120 adapted to hold the fluid chamber substantially centrally within the spout cap member and provide a passage for fluid between the spacers. The spacers 120 may engage with the underside of the top wall 52 of the spout cap member 36, to allow fluid to pass between the fluid chamber 70 and the top wall 52 in the firing position.

The side wall 50 of the spout cap member 36 has an anti-tamper band 122 to prevent removal of the spout cap member 36 from the neck 38 of a beverage container 34 without prior removal of the anti-tamper band 122.

The closure device provides a means of introducing a component to a beverage which can be consumed through a "sports cap" type spout. The components of the closure device can be manufactured simply and cheaply. The number of different components is minimised. The tank or fluid chamber 70 can be made separately and of a different, fluid impervious material, for example by blow-moulding.

Because the closure device 10 of the present invention does not require a housing flange between the external thread of the bottle neck and the internal thread of an outer cap wall, the closure device of the present invention is no wider than a conventional closure.

Figure 4:
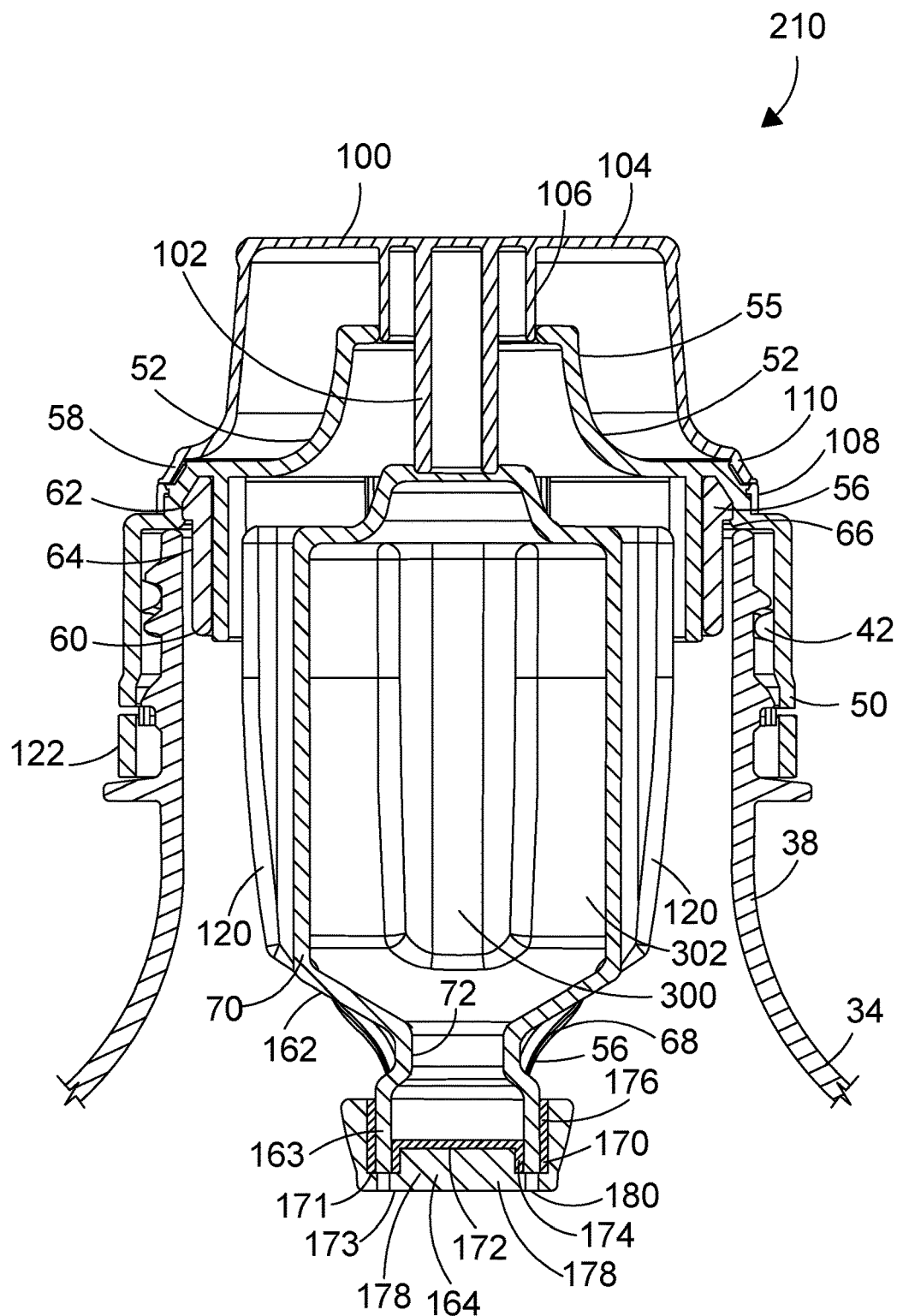
FIG. 4 shows a schematic cross-sectional view of a closure device according to another embodiment of the present invention when attached to the neck of a bottle in a first armed position.
Figure 5:
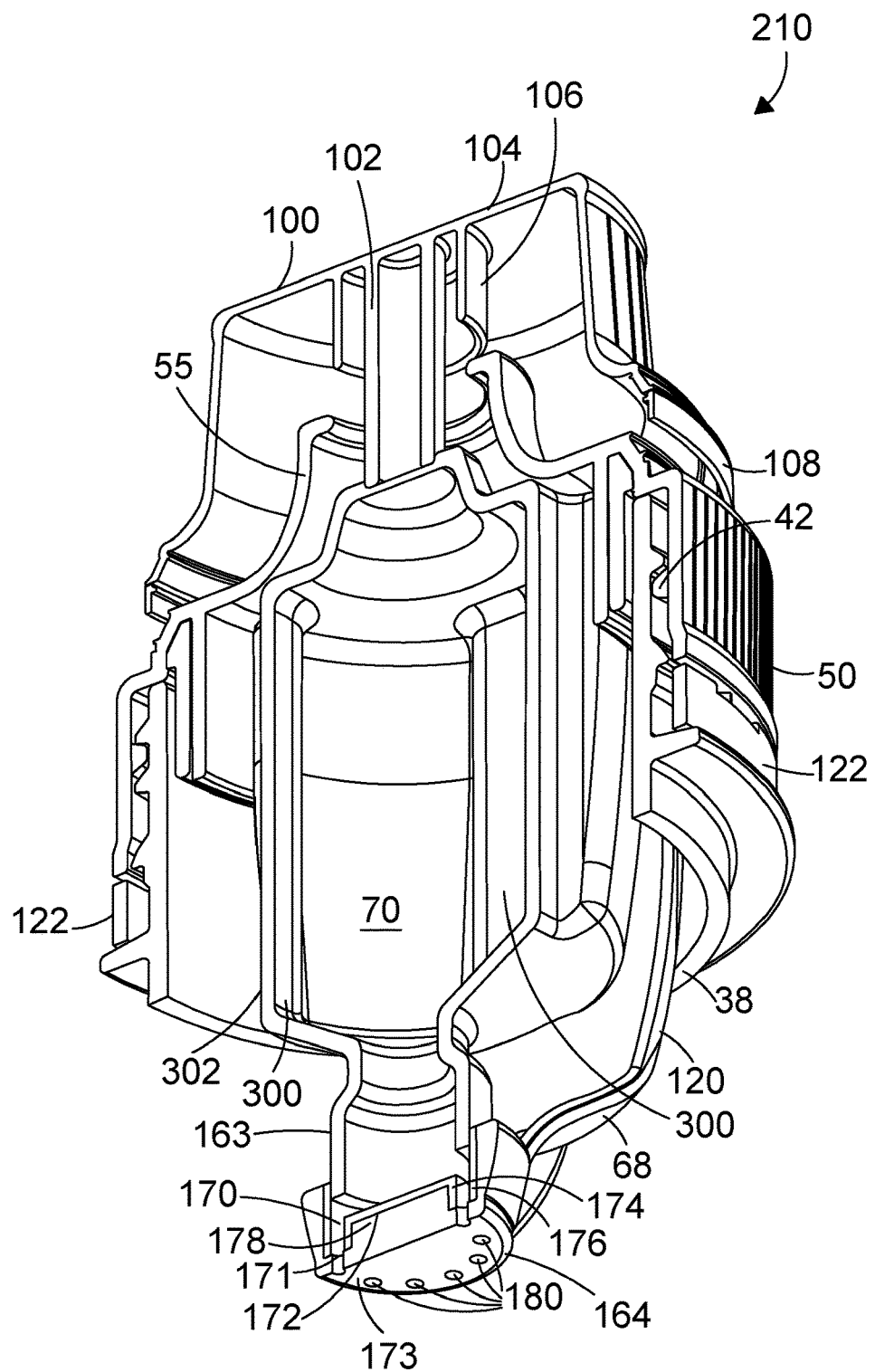
FIG. 5 shows a perspective cross-sectional view of the closure device of FIG. 4 in a second firing position.
Figure 6:
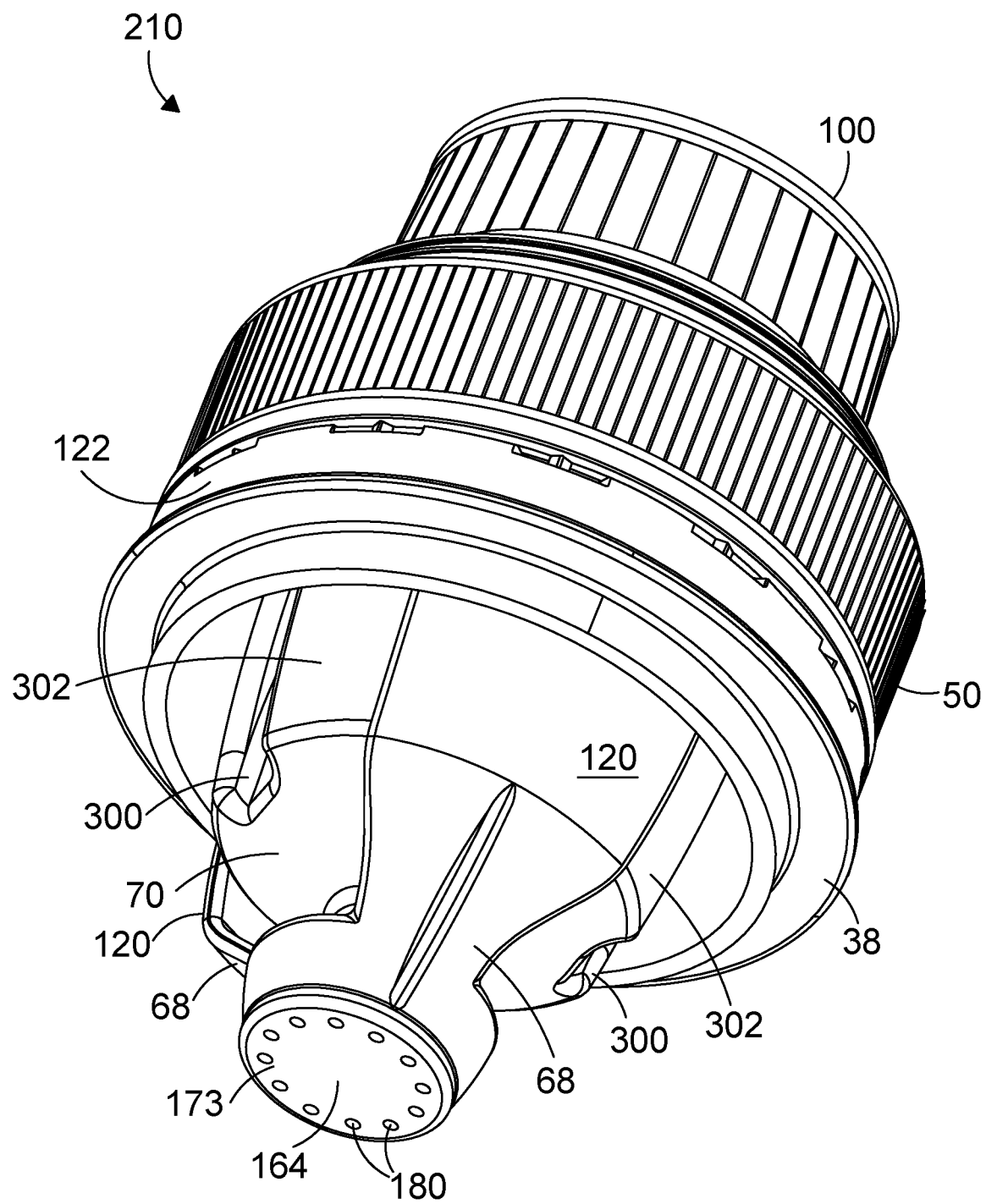
FIG. 6 shows a perspective view of the exterior of the closure device of FIG. 4 in the first armed position.

With reference to FIGS. 4, 5 and 6 there is shown a closure device 210 which is similar to the closure device 10 illustrated in FIGS. 1, 2 and 3. Components of the closure device which are the same have the same reference numeral. The closure device 210 differs in the nature of the plug member used to close the bottom aperture 72 of the fluid chamber 70.

As in FIG. 2 the closure device 210 is connected to the neck 38 of a container 34 that contains a fluid in a main liquid compartment (not shown). The container 34 may be, for example, a PET bottle, and may hold a variety of liquids such as water, or a pharmaceutical or glucose solution.

In the closed position of FIG. 4 the fluid chamber 70 is sealed closed by a valve arrangement comprising an annular boss member 163 and the plug member 164.

The annular boss member 163 is a cylindrical wall portion formed from an open end of the external wall 302 of the tank 70. The plug member 164 has an annular channel 170 arranged in the first upper side 172 of the plug member 164. The channel 170 has inner and outer concentric side walls and a channel floor 171.

The channel 170 has a first seal 174 provided on the inner concentric side wall of the channel 170 which seals between the plug member 164 and an internal surface of the annular boss member 163 in the closed position of FIG. 4.

The channel 170 also has a second seal 176 provided on the outer concentric side wall of the channel 170 which seals between the plug member 164 and an external surface of the annular boss member 163 in the closed position of FIGS. 4 and 5.

The annular channel 170 has one or more orifices 180 extending from the channel floor 171 through the plug member 164 to a second lower side 173 of the plug member opposite the first upper side 172. In the illustrated example the annular channel 170 has a plurality of orifices 180 extending from the channel floor 171, typically between 10 and 20 orifices. The plurality of orifices 180 can be seen in FIGS. 5 and 6. Each orifice 180 forms a nozzle on the second lower side 173.

However the annular channel 170 may instead have a single orifice 180, or any other number of orifices 180. Each orifice may typically have a diameter of between 0.5 mm and 2.0 mm.

In the illustrated example the orifices 180 extend vertically, i.e. parallel to the longitudinal axis of rotation of the closure assembly, from the channel floor 171 through the plug member 164 to the second lower side 173 of the plug member opposite the first upper side 172. However the one or more orifices 180 may instead be angled. Alternatively the one or more orifices 180 may extend horizontally, i.e. perpendicular to the longitudinal axis of rotation of the closure assembly 210, through the outer side wall of the channel 170.

The plug member 164 includes a stopper portion 178 which in the closed position projects inside the boss member 163, and acts with the first and second seals 174, 176 to form a secure and positive seal, capable of maintaining the pressure within the pressurised tank 70. The seals 174, 176 ensure that when the closure assembly 210 is in the closed position shown in FIG. 4 the orifices 180 are sealed closed and are not in communication with the interior volume of the tank 70.

In the open or firing position of FIG. 5 the fluid chamber 70 is opened by the raising of the boss member 163, which is connected to the fluid chamber or tank 70, relative to the plug member 164, by the same mechanism as is described with reference to the embodiment of FIGS. 1 to 3. The boss member 163 lifts away from the annular channel 170 so that the pressurised additive is ejected through the orifices or nozzles 180.

In the embodiment of FIGS. 4 to 6 the seals 174, 176 are formed as a resilient coating. Alternatively the seals 174, 176 may be formed monolithically from a resilient material with the stopper portion 178, which can be attached by any suitable means to the ribs 120.

In both embodiments the tank or fluid chamber 70 has a number of inwardly directed ribs 300 in its otherwise cylindrical external wall 302. These are formed to provide channels on the outside of the fluid chamber 70 so that when the closure 10, 210 is in the open or firing position of FIGS. 3 and 5, liquid in the container or bottle 34 can pass along the channels between the fluid chamber 70 and the spout cap body 55 to the spout aperture 54. In this way the liquid is not impeded, particularly if it is a viscous liquid, and a user can drink freely from the container 34, or otherwise dispense the liquid from the container 34.

The invention is not limited to the specific embodiments described, and modifications and alternatives are possible. The shape, material and size of the various components can be modified. In particular the shape and size of the first and second plug members may be varied, as can the shape and size of the fluid chambers.

The invention claimed is:

1. A closure device for use with a container having a main liquid compartment and an opening with a container neck, the closure device comprising:
   a spout cap member having a top wall with a spout aperture, a side wall extending below the top wall and adapted to be secured to the opening of the container, and a plug support structure extending from the top wall inside the side wall, a fluid chamber movably held within the spout cap member and having a bottom aperture, the fluid chamber containing an additive liquid and a pressurised propellant, a plug member fixed to the plug support structure and sealingly engageable in the bottom aperture of the fluid chamber, and a spout cover adapted to removably cover the spout aperture, wherein the spout cover includes a strut extending through the spout aperture to an abutment surface on the fluid chamber, wherein the fluid chamber is adapted to move relative to the spout cap member between:

a first armed position of the closure device, in which the plug member seals the bottom aperture closed, and the spout cover is engaged with the spout cap member, and the pressurised propellant urges the abutment surface on the fluid chamber against the strut of the spout cover, and a second firing position, in which the spout cover is disengaged from the spout cap member, and the pressurised propellant urges the fluid chamber upwards relative to the plug member, so that the plug member no longer seals the bottom aperture closed.

2. The closure device of claim 1, wherein the side wall of the cap member is threaded and is adapted to engage with a thread or projection provided on the container neck.

3. The closure device of claim 1, wherein the spout cover includes a spout aperture plug member adapted to seal the spout aperture closed when the spout cover is engaged with the spout cap member.

4. The closure device of claim 1, wherein the plug member at least one nozzle provided at the lower end of the plug member, opposite the fluid chamber.

5. The closure device of claim 4, wherein the plug member has a single nozzle, wherein the plug member includes an internal nozzle passage extending axially upwards in the plug member from the nozzle, and wherein the plug member includes a transverse internal passage extending to the lateral exterior surface of the plug member and in communication with the internal nozzle passage.

6. The closure device of claim 4, wherein at least one nozzle is provided in an annular channel in the plug member.

7. The closure device of claim 6, wherein the annular channel is adapted to sealingly engage with an annular boss member provided at or adjacent to the bottom aperture of the fluid chamber in the first armed position.

8. The closure device of claim 1, wherein the spout cap member comprises a spout cap body and the plug support structure, wherein the spout cap body includes a collar extending downwards from the top wall and radially inside the side wall, and wherein the plug support structure is adapted to fit around the collar of the spout cap body.

9. A container having a container neck and an opening, wherein the container contains a liquid, and wherein a closure device according claim 1 is secured to the container neck to close the container.

10. A method of introducing an additive liquid into a container, the method comprising:

providing a closure device with comprising:

a spout cap member having a top wall with a spout aperture, a side wall extending below the top wall and adapted to be secured to an opening of the container, and a plug support structure extending from the top wall inside the side wall, a fluid chamber movably held within the spout cap member and having a bottom aperture, a liquid additive and a pressurised propellant inside the fluid chamber, a plug member fixed to the plug support structure and sealingly engageable in the bottom aperture of the fluid chamber, and a spout cover adapted to removably cover the spout aperture, wherein the spout cover includes a strut extending through the spout aperture to an abutment surface on the fluid chamber, wherein the fluid chamber is adapted to move relative to the spout cap member between:

a first armed position of the closure device, in which the plug member seals the bottom aperture closed, and the spout cover is engaged with the spout cap member, and the pressurised propellant urges the abutment surface on the fluid chamber against the strut of the spout cover, and a second firing position, in which the spout cover is disengaged from the spout cap member, and the pressurised propellant urges the fluid chamber upwards relative to the plug member, so that the plug member no longer seals the bottom aperture closed, while the closure device is in the first armed position placing the closure device on the neck of a container containing a liquid, at least partially removing the spout cover from the spout cap member, thereby raising the strut of the spout cover relative to the spout cap member, allowing the internal pressure of the pressurised propellant inside the fluid chamber to raise the fluid chamber relative to the plug member to the second firing position, and urging the additive liquid from the fluid chamber into the container under pressure of the pressurised propellant in the fluid chamber while the closure device is in the second firing position.

11. The method of claim 10, including the further step of mixing the additive liquid with the liquid in the container.

12. The method of claim 11, wherein the mixing step is effected through ejection of the additive liquid through the nozzle at a sufficient velocity under pressure of the pressurised propellant in the fluid chamber.

13. The method of claim 12, including the further step of urging the mixed additive liquid and liquid from the container through the spout aperture.

* * * * *